June 1, 1937.  B. ELLEFSEN  2,082,620
INDIVIDUAL WHEEL SUSPENSION FOR VEHICLES
Filed Oct. 31, 1935  2 Sheets-Sheet 1
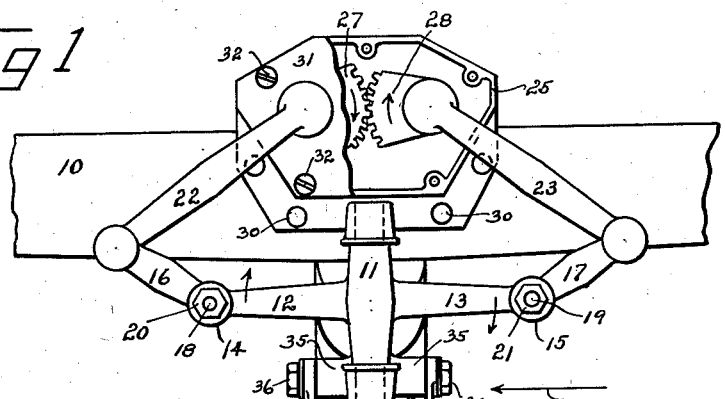
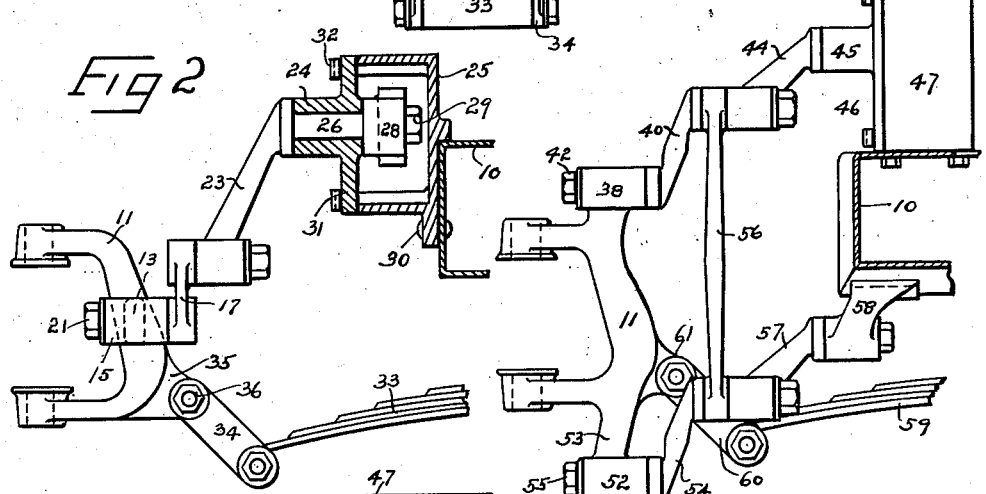
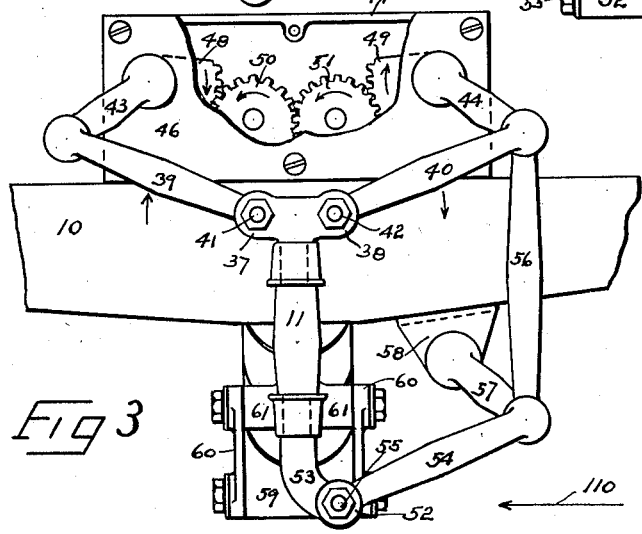
INVENTOR.
Bjarne Ellefsen
BY
Henrik J. Schmidt
ATTORNEYS.

June 1, 1937.  B. ELLEFSEN  2,082,620
INDIVIDUAL WHEEL SUSPENSION FOR VEHICLES
Filed Oct. 31, 1935  2 Sheets-Sheet 2
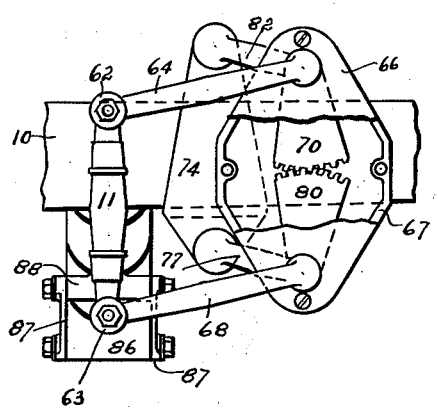
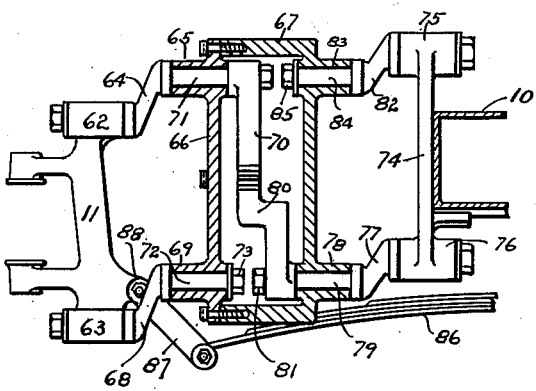
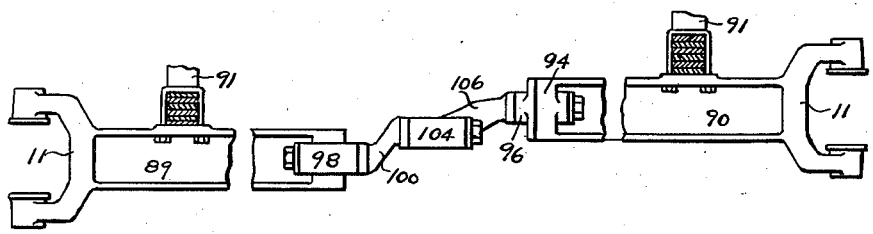
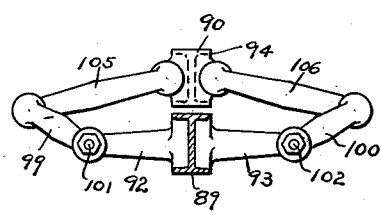
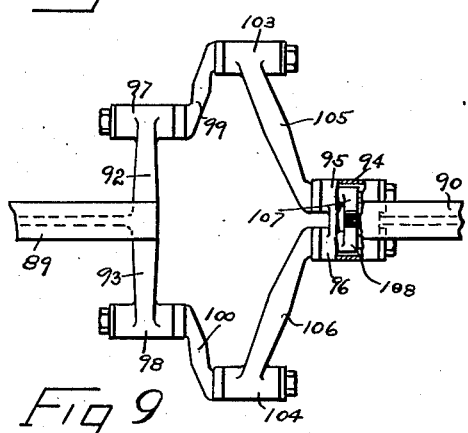
INVENTOR.
Bjarne Ellefsen,
BY
ATTORNEYS.

Patented June 1, 1937

2,082,620

UNITED STATES PATENT OFFICE 2,082,620

INDIVIDUAL WHEEL-SUSPENSION FOR VEHICLES

Bjarne Ellefsen, Brooklyn, N. Y.

Application October 31, 1935, Serial No. 47,589

2 Claims. (Cl. 267—19)

The invention relates to improvements in wheel suspension and particularly to suspension for front wheels of automotive vehicles, but may be employed with other wheels. It has for one object to provide a device by means of which the front wheels of an automobile can be supported independently of each other, so as to obtain many advantages not found in the ordinary spring suspension. Another important object is to so construct the device that any shock to either of the wheels will be absorbed in a vertical direction without any perceptible change in any of the wheel adjustments, such as the caster, camber and king pin angles, or any perceptible shock to the vehicle itself.

A still further object is to provide a device which will more effectively absorb and cushion any shocks, which can be employed with any make of automobile, which is of simple and rugged construction, which has no parts easily broken or apt to get out of order, which can be manufactured at a relatively low cost, and which will not alter the general appearance or design of the vehicle on which used.

These and various other objects and advantages will be readily understood from the following description, and from the accompanying drawings of preferred embodiments of the invention, in which, however, various modifications may be made without departing from the scope of the appended claims. In the drawings.

Fig. 1 is a side view of the wheel suspension device, shown in connection with a front-wheel steering knuckle, and with a part broken away;

Fig. 2 a front view of Fig. 1, shown partly in section;

Fig. 3 a side view of a similar, but slightly modified device;

Fig. 4 a front view of Fig. 3;

Fig. 5 a side view of another slightly modified device;

Fig. 6 a front view of Fig. 5;

Fig. 7 a front view of still another modification;

Fig. 8 a side view of Fig. 7; and

Fig. 9 a top view of Fig. 7.

Reference is now made to the drawings in which all the devices are illustrated as used for the front wheels of an automotive vehicle, and in which a part of an automobile chassis is shown at 10, and the steering knuckle at 11. Referring now particularly to Figs. 1 and 2, a pair of sidewardly extending arms 12 and 13 are formed integrally with the frame of the steering knuckle 11 and these arms terminate in bearings 14 and 15. Links 16 and 17 are pivotally connected to these bearings by means of threaded studs 18 and 19 and are prevented from displacement by nuts 20 and 21. The links 16 and 17 are connected to levers 22 and 23 and these levers are pivoted in bearings 24 formed on the cover of a gear casing 25. The links 22 and 23 are each formed integrally with a stud 26 on which gear segments 27 and 28 are keyed to prevent rotation. The gears are further secured to the studs by means of nuts 29. The gear casing is secured to the chassis 10 by means of rivets 30, while the cover 31 of the gear casing is secured to the casing by means of screws 32.

An elliptical spring 33 is connected intermediate of its ends to the other side of a member of the chassis, while the ends of this spring are connected to shackle links 34. These shackle links are pivotally connected to a bearing 35, formed on the rear of the steering-knuckle frame 11, by means of bolts 36.

In Figs. 3 and 4 a slightly modified device is shown. In this instance, bearings 37 and 38 are formed at the upper end of the steering-knuckle frame. Links 39 and 40 are pivotally connected to these bearings by means of the bolts 41 and 42. The links are connected to levers 43 and 44 which are mounted in bearings 45 formed on a cover 46 on a gear box 47. Gear segments 48 and 49 are keyed on studs formed integrally with the levers 43 and 44 so as to turn with these levers. Two idlers 50 and 51 are interposed between the gear segments 48 and 49.

A bearing 52 is formed at the lower end of the steering-knuckle frame on a downwardly and sidewardly extending arm 53. A link 54 is pivoted to this bearing by means of a stud 55. Another link 56 connects the upper link 40, as well as the lever 44, with the lower link 54 and with a lever 57 which is pivoted in a bracket 58 secured to the chassis 10. An elliptical spring 59 is secured intermediate of its end to the otherside of a member of the chassis, as in the former case, and the ends of this spring are secured to shackle links 60. The other end of the shackle link is pivoted to a bearing 61 formed on the rear of the steering-knuckle frame 11.

In the modification shown in Figs. 5 and 6, bearings 62 and 63 are formed, respectively, on the upper and lower ends of the steering-knuckle frame 11. A lever 64 is connected between bearing 62 and a bearing 65 formed on the cover 66 of a gear box 67. Another lever 68 is connected between bearing 63 and another bearing 69 formed on the cover 66. A gear segment 70 is keyed on a stud 71 formed integrally on the end of the lever 64 so that the segment will turn with the lever. The lever 68 is likewise provided with an integral stud 72. This stud is merely rotatingly secured in the bearing 69 and prevented from displacement by a nut 73.

A bracket 74 is secured to the chassis 10 and this bracket is also provided with an upper bearing 75 and a lower bearing 76. A lever 77 is connected between bearing 76 and a bearing 78 formed on the gear casing 67. The lever 77 is provided with an integral stud 79 to which a gear segment 80 is keyed and secured by means of a nut 81. This gear segment meshes with the gear segment 70. A lever 82 is connected between the bearing 75 and a bearing 83 provided on the gear casing 67. This lever is also provided with an integral stud 84 which is rotatingly mounted in the bearing and prevented from displacement by means of a nut 85. An elliptical spring 86 which is secured to the chassis, as previously described, has its ends secured to shackle links 87. The other end of each of these shackle links are pivotally connected to a bearing 88 formed on the rear of the steering-knuckle frame 11.

In the modification shown in Figs. 7, 8 and 9, a front axle consisting of two parts 89 and 90 is employed. The steering knuckles 11 are located at the ends of these parts and the chassis of the vehicle is supported on these parts by means of elliptical springs 91. The axle part 89 is provided with two sidewardly extending arms 92 and 93, while the axle part 90 is provided with a gear casing 94 having two bearings 95 and 96. Bearings 97 and 98 are formed at the extreme ends of the arms 92 and 93. A pair of links 99 and 100 are pivoted on studs 101 and 102 in the bearings 97 and 98. The other end of these links have studs which are pivoted in bearings 103 and 104 formed on the end of a set of levers 105 and 106. These last-mentioned levers are in turn pivotally mounted in the bearings 95 and 96 and provided with integral studs which extend through the gear casing 94 and on which gear segments 107 and 108 are keyed, all as plainly shown in Fig. 9.

The device shown in Figs. 1 and 2 operates in the following manner. If the front wheel supported in the steering knuckle receives a shock in the direction indicated by the arrow 109, as for example when passing over a curb or other obstacle, the force of the shock will tend to turn the arms 12 and 13 in the directions indicated by the arrows. This in turn, through the action of links 16 and lever 22, would cause the gear segment 27 to turn in the direction indicated by the arrow marked on this gear. However, the action imparted to gear 28 through the arm 13, link 17 and lever 23 would be in the direction indicated by the arrow on this segment, or contrary to the movement which the gear 17 would normally impart to it. This equal and opposite action set up between the two gear segments absorbs the shock imparted to the front wheel and causes the steering knuckle to be lifted in an exact vertical direction against the tension of the spring 33.

The device shown in Figs. 3 and 4 works similarly, except that idlers 50 and 51 has been interposed between the gear segments 48 and 49 and another links mechanism, consisting of the parts 54, 56 and 57, has been added to aid in strengthening the device and to still further add in absorbing shocks received in the direction indicated by the arrow 110.

In the embodiment shown in Figs. 5 and 6, the gear casing is not secured to the chassis as in the cases previously described, but the connection between the device and the chassis is made through the brackets 74. The device otherwise works similarly, in that the opposite movements imparted to the gear segments 70 and 80 absorb the shocks and cause the wheel to lift in a vertical direction.

The action of the embodiment shown in Figs. 7, 8 and 9 is exactly similar to the action in the device illustrated in Figs. 1 and 2, except that the elliptical springs 91 are secured lengthwise with the chassis instead of tranversely as in Figs. 1 and 2.

Having described my invention and its objects, what I claim as new and wish to protect by Letters Patent is:

1. A device of the class described comprising a wheel-supporting member, a gear casing, a pair of gears contained in said casing, the casing secured to the chassis of the vehicle on which employed, similar pairs of links and levers connected between the gears and the wheel-supporting member on opposite side of said member and at the top thereof, the wheel-supporting member yieldingly attached to a spring member secured to said chassis, the pairs of links and levers so connected that the gears and the wheel-supporting member will cause similar but opposite angular movements to both pairs of links and levers when shocks are imparted to the wheel-supporting member, and an additional set of links and levers provided on one side of the wheel-supporting member and connected between the lower part of said member and one of the upper links.

2. A device of the class described comprising a wheel-supporting member, a gear casing, a train of gears contained in said casing, the casing secured to the chassis of the vehicle on which employed, similar pairs of links and levers connected between the outer gears of said train of gears and the wheel-supporting member on opposite side of said member and at the top thereof, the wheel-supporting member yieldingly attached to a spring member secured to said chassis, the pairs of links and levers so connected that the gears and the wheel-supporting member will cause similar but opposite angular movements to both pairs of links and levers when shocks are imparted to the wheel-supporting member, and an additional set of links and levers provided on one side of the wheel-supporting member and connected between the lower part of said member and one of the upper links.

BJARNE ELLEFSEN.